United States Patent
Kawaguchi et al.

(10) Patent No.: US 10,287,472 B2
(45) Date of Patent: May 14, 2019

(54) THERMALLY CONDUCTIVE MATERIAL

(71) Applicant: KITAGAWA INDUSTRIES CO., LTD., Aichi (JP)

(72) Inventors: Yasuhiro Kawaguchi, Kasugai (JP); Takashi Mizuno, Kakamigahara (JP)

(73) Assignee: KITAGAWA INDUSTRIES CO., LTD., Aichi (JP)

( * ) Notice: Subject to any disclaimer, the term of this patent is extended or adjusted under 35 U.S.C. 154(b) by 462 days.

(21) Appl. No.: 14/315,810

(22) Filed: Jun. 26, 2014

(65) Prior Publication Data

US 2015/0004388 A1    Jan. 1, 2015

(30) Foreign Application Priority Data

Jun. 27, 2013  (JP) .................................. 2013-135303

(51) Int. Cl.
 *C09K 5/14*     (2006.01)

(52) U.S. Cl.
 CPC ............ *C09K 5/14* (2013.01); *Y10T 428/256* (2015.01)

(58) Field of Classification Search
 CPC ............................. C09K 5/14; Y10T 428/256
 USPC ........................................................ 428/212
 See application file for complete search history.

(56) References Cited

U.S. PATENT DOCUMENTS

| | | | | |
|---|---|---|---|---|
| 5,279,896 A | * | 1/1994 | Tokunaga | ............. C08F 220/18 428/355 AC |
| 5,851,327 A | * | 12/1998 | Landin | .................... B32B 15/06 156/71 |
| 2002/0003073 A1 | * | 1/2002 | Lutz | ........................ F16F 9/062 188/322.19 |
| 2004/0087721 A1 | * | 5/2004 | Bruhn | ................. C08L 23/0869 525/132 |
| 2009/0073853 A1 | * | 3/2009 | Isobe | ................... G11B 7/0935 369/112.23 |
| 2013/0244020 A1 | | 9/2013 | Terada et al. | |

FOREIGN PATENT DOCUMENTS

| | | |
|---|---|---|
| JP | 2007211141 A | 8/2007 |
| JP | 2010235953 A | 10/2010 |
| JP | 4679383 B2 | 4/2011 |
| JP | 2012007129 A | 1/2012 |
| JP | 2012102301 A | 5/2012 |
| JP | 2012144626 A | 8/2012 |
| JP | 2013053255 A | 3/2013 |

OTHER PUBLICATIONS

Yasuhiro (JP 2007-211141 machine translation), Feb. 9, 2006.*
Notice of Reasons for Rejection from corresponding Japanese Patent Appl. No. 2413-135303, dated Nov. 29, 2016.

* cited by examiner

*Primary Examiner* — Lawrence D Ferguson

(57) ABSTRACT

A thermally conductive material according to the present invention is prepared by allowing silicon carbide having an average particle size of 10 μm or more and less than 50 μm, aluminum hydroxide having an average particle size of 1 μm or more and less than 10 μm, and magnesium hydroxide having an average particle size of 0.5 μm or more and less than 1 μm to be contained in a polymer obtained by polymerizing a monomer containing acrylic acid ester.

1 Claim, 1 Drawing Sheet

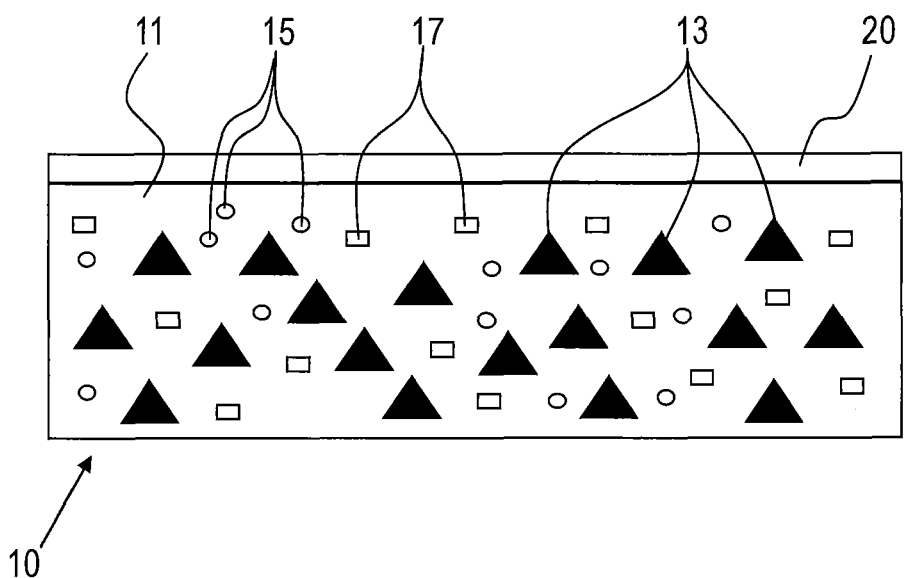

THERMALLY CONDUCTIVE MATERIAL

CROSS-REFERENCE TO RELATED APPLICATIONS

This application claims the benefit of Japanese Patent Application No. 2013-135303 filed on Jun. 27, 2013 in the Japan Patent Office, the disclosure of which is incorporated herein by reference.

BACKGROUND

The present invention relates to a thermally conductive material for use in audio equipment, information-related equipment, information transmission equipment, and the like. Specifically, the present invention relates to the thermally conductive material having vibration-damping properties besides thermal conductivity.

Conventionally, an optical disk such as a CD-ROM, a Mini Disc, and a DVD, a magneto-optical disk, and equipment such as a hard disk are equipped with a vibration-damping material that damps vibration because they are sensitive to vibration due to their mechanisms. When silicone-based resin is used as a vibration-damping material, there is a possibility that siloxane gas is generated to adversely affect electronic equipment, which is undesirable. On the other hand, it is also required to provide thermal conductivity to the vibration-damping material because the vibration-damping material transfers heat generated in the CD-ROM or the like to a member such as a casing, which functions as a heat sink.

Therefore, a thermally-conductive and vibration-damping material is proposed that is prepared by allowing silicon carbide having an average particle size of 50 to 100 μm and magnesium hydroxide having an average particle size of 0.5 to 1.0 μm to be contained in a polymer obtained by polymerizing a monomer containing acrylic acid ester. Such a material has excellent vibration-damping properties and thermal conductivity and, what is more, is free from fear of generating siloxane gas because the material is an acrylic-based (see, for example, Japanese Patent Publication No. 4679383).

SUMMARY

In recent years, the material of this kind has been more widely used for a mobile terminal such as a multifunctional mobile phone (so-called smartphone) and a tablet PC, and thus, the material is required to have a thin film shape and to be deformed by a predetermined amount with a small compressive load. Nevertheless, it is difficult to decrease the thickness of the material described in the above-described Japanese Patent Publication No. 4679383, and even if the material can be formed into a thin film, a large compressive load is required to compress the material because the material contains silicon carbide having the average particle size of 50 μm or more.

One aspect of the present invention is to provide a thermally conductive material that combines favorable vibration-damping properties and favorable thermal conductivity, and that exhibits high deformability with a small compressive load even in a thin film state.

A thermally conductive material according to one aspect of the present invention is prepared by allowing silicon carbide having an average particle size of 10 μm or more and less than 50 μm, aluminum hydroxide having an average particle size of 1 μm or more and less than 10 μm, and magnesium hydroxide having an average particle size of 0.5 μm or more and less than 1 μm to be contained in a polymer obtained by polymerizing a monomer containing acrylic acid ester.

As a result of conducting experiments with various different particle sizes of fillers such as silicon carbide, aluminum hydroxide, magnesium hydroxide, the applicant of the present application has found that the obtained thermally conductive material can be easily formed into a thin film having a thickness of about 100 μm by setting the particle sizes of the silicon carbide, the aluminum hydroxide, and the magnesium hydroxide to the above-described ranges. In the above-described combination of the particle sizes, the silicon carbide, the aluminum hydroxide, and the magnesium hydroxide have three particle sizes different from each other, and even the average particle size of the silicon carbide, which is the largest of the three, is less than 50 μm. Therefore, the thermally conductive material can be easily formed into the thin film having the thickness of about 100 μm, and a compressive load required to compress such a film is also small. Moreover, this thermally conductive material combines favorable vibration-damping properties and favorable thermal conductivity, and is free from fear of generating siloxane gas, similarly to the material described in the above described Japanese Patent Publication No. 4679383.

It is preferred for the above-described polymer to contain 100 to 200 parts by weight of the silicon carbide having the average particle size of 10 μm or more and less than 50 μm, 100 to 200 parts by weight of the aluminum hydroxide having the average particle size of 1 μm or more and less than 10 μm, and 50 to 100 parts by weight of the magnesium hydroxide having the average particle size of 0.5 μm or more and less than 1 μm, with respect to 100 parts by weight of the polymer obtained by polymerizing the monomer containing acrylic acid ester. When less than 100 parts by weight of the silicon carbide is contained, thermal conductivity is greatly reduced, and when more than 200 parts by weight of the silicon carbide is contained, a compressive load required for compression becomes large and film adhesiveness is insufficient. When less than 100 parts by weight of the aluminum hydroxide is contained, incombustibility is insufficient, and when more than 200 parts by weight of the aluminum hydroxide is contained, a compressive load required for compression becomes large, ingredients are difficult to be mixed and kneaded, and film adhesiveness is insufficient. When less than 50 parts by weight of the magnesium hydroxide is contained, incombustibility is insufficient, and when more than 100 parts by weight of the magnesium hydroxide is contained, ingredients are difficult to be mixed and kneaded, and film adhesiveness is insufficient. However, the mixing ratio is not limited to this.

An acrylate-based multifunctional monomer of more than 0.1% and less than 1% by weight with respect to the polymer may be further added to the polymer. In that case, adhesiveness of the polymer to a PET film or the like is improved, and in a case where the thermally conductive material is formed into the film, handling thereof can become much easier if such a film is applied to a PET film. Moreover, by an action of the multifunctional monomer, aggregation of magnesium hydroxide can be suppressed favorably even if the average particle size of the silicon carbide is small, and thus, thermal conductivity and mechanical characteristics of the thermally conductive material can be exerted much more stably. Furthermore, crosslink density is improved by adding the multifunctional monomer of more than 0.1% by weight, and thus, the thermally conductive material can be handled easily even when formed into the thin film having the thickness of about 100 μm.

The thermally conductive material according to the present invention may be formed into the film having the thickness of 100 μm to 300 μm. In such a case, the thermally conductive material can be applied further favorably to a multifunctional mobile phone, a tablet PC, and the like. In that case, a PET film having a thickness of 6 μm or less may be layered on one surface of the film-shaped thermally conductive material, and at least a surface opposite to the one surface on which the PET film is layered may have adhesiveness. In such a case, handling of the thermally conductive material becomes extremely easy by layering, on the one surface thereof, the PET film that can be easily deformed due to its thickness of 6 μm or less and that has favorable sliding properties. In addition, since the other surface of the thermally conductive material has adhesiveness, the thermally conductive material can be easily attached to an electronic component or the like without involving an object, such as a tape, which inhibits thermal conductivity.

BRIEF DESCRIPTION OF THE DRAWINGS

The present invention will be described below by way of example with reference to an accompanying drawing, in which:

FIG. 1 is an explanatory diagram schematically showing a structure of a thermally conductive material to which the present invention is applied.

DETAILED DESCRIPTION OF THE PREFERRED EMBODIMENTS

[Experimental Examples]

As shown schematically in FIG. 1, the applicant of the present application prepared a thermally conductive material 10 by allowing a silicon carbide 13, a magnesium hydroxide 15, and an aluminum hydroxide 17 to be contained in a polymer 11 obtained by polymerizing a monomer containing acrylic acid ester, and formed the thermally conductive material 10 into a film having a thickness of 100 μm. Subsequently, a PET film 20 having a thickness of 5 μm was applied to one surface of the thermally conductive material 10.

The applicant of the present application changed particle sizes and a mixing ratio of the respective fillers (the silicon carbide 13, the magnesium hydroxide 15, and the aluminum hydroxide 17) and a mixing ratio of bifunctional acrylate added to the polymer 11 variously as below, and tested changes in properties.

TABLE 1

| | Sample 1 | | | | | |
|---|---|---|---|---|---|---|
| | Ingredient | | | | | |
| | Acrylic polymer | Bifunctional acrylate | Vulcanizing agent | Silicon carbide | Magnesium hydroxide | Aluminum hydroxide |
| Manufacturer | Nippon Shokubai Co., Ltd. | Kyoeisha Chemical Co., Ltd. | Kayaku Akzo Corporation | Showa Denko K.K. | Konoshima Chemical Co., Ltd. | Nippon Light Metal Co., Ltd. |
| Item number | HD-A218 | 1.6HX-A | Perkadox 16 | GC#180 | N-4 | BF083 |
| Average particle size (μm) | — | — | — | 80 | 0.5 | 8 |
| wt % | 21.01 | 0 | 0.21 | 31.51 | 15.76 | 31.51 |

Sample 1 shown in Table 1 is a material to which a mixing ratio and particle sizes that are approximately the same as those disclosed in the above-described Japanese Patent Publication No. 4679383 are adopted. Although Sample 1 exhibited relatively favorable vibration-damping properties (loss factor tan δ measured by half-power band width method is 0.9), a compressive load required to compress the thermally conductive material 10 having the thickness of 100 μm by 30% was large (200 N/cm$^2$). Adhesiveness between the thermally conductive material 10 and the PET film 20 was low, and thus, there is a possibility that the thermally conductive material 10 peels off from the PET film 20 when attached to an electronic component or the like.

TABLE 2

| | Sample 2 | | | | | |
|---|---|---|---|---|---|---|
| | Ingredient | | | | | |
| | Acrylic polymer | Bifunctional acrylate | Vulcanizing agent | Silicon carbide | Magnesium hydroxide | Aluminum hydroxide |
| Manufacturer | Nippon Shokubai Co., Ltd. | Kyoeisha Chemical Co., Ltd. | Kayaku Akzo Corporation | Showa Denko K.K. | Konoshima Chemical Co., Ltd. | Nippon Light Metal Co., Ltd. |

TABLE 2-continued

Sample 2

| | Acrylic polymer | Bifunctional acrylate | Vulcanizing agent | Silicon carbide | Magnesium hydroxide | Aluminum hydroxide |
|---|---|---|---|---|---|---|
| Item number | HD-A218 | 1.6HX-A | Perkadox 16 | GC#600 | N-4 | BF083 |
| Average particle size (μm) | — | — | — | 35 | 0.5 | 0 |
| wt % | 21.01 | 0 | 0.21 | 31.51 | 15.76 | 31.51 |

In contrast, Sample 2 (see Table 2) prepared similarly to Sample 1, except that the average particle size of the silicon carbide 13 is 35 μm, exhibited extremely favorable vibration-damping properties (loss factor tan δ=1.2), and a compressive load required to compress the thermally conductive material 10 having the thickness of 100 μm by 30% was small (40 N/cm$^2$). However, adhesiveness between the thermally conductive material 10 and the PET film 20 was low similarly to Sample 1, and thus, there is a possibility that the thermally conductive material 10 peels off from the PET film 20 when attached to an electronic component or the like.

TABLE 3

Sample 3

| | Acrylic polymer | Bifunctional acrylate | Vulcanizing agent | Silicon carbide | Magnesium hydroxide | Aluminum hydroxide |
|---|---|---|---|---|---|---|
| Manufacturer | Nippon Shokubai Co., Ltd. | Kyoeisha Chemical Co., Ltd. | Kayaku Akzo Corporation | Showa Denko K.K. | Konoshima Chemical Co., Ltd. | Nippon Light Metal Co., Ltd. |
| Item number | HD-A218 | 1.6HX-A | Perkadox 16 | GC#3000 | N-4 | BF083 |
| Average particle size (μm) | — | — | — | 5 | 0.5 | 8 |
| wt % | 21.01 | 0 | 0.21 | 31.51 | 15.76 | 31.51 | it was difficult to mix and knead ingredients, and thickness reduction was also difficult.

TABLE 4

Sample 4

| | Acrylic polymer | Bifunctional acrylate | Vulcanizing agent | Silicon carbide | Magnesium hydroxide | Aluminum hydroxide |
|---|---|---|---|---|---|---|
| Manufacturer | Nippon Shokubai Co., Ltd. | Kyoeisha Chemical Co., Ltd. | Kayaku Akzo Corporation | Showa Denko K.K. | Konoshima Chemical Co., Ltd. | Nippon Light Metal Co., Ltd. |
| Item number | HD-A218 | 1.6HX-A | Perkadox 16 | GC#600 | N-4 | BF083 |
| Average particle size (μm) | — | — | — | 35 | 0.5 | 8 |
| wt % | 20.99 | 0.02 | 0.21 | 31.51 | 15.76 | 31.51 |

Sample 3 prepared similarly to Sample 1 as shown in Table 3, except that the average particle size of the silicon carbide 13 is further smaller, i.e., 5 μm, exhibited relatively favorable vibration-damping properties (loss factor tan δ=0.7), and a compressive load required to compress the thermally conductive material 10 having the thickness of 100 μm by 30% was small (40 N/cm$^2$). However, adhesiveness between the thermally conductive material 10 and the PET film 20 was low similarly to Sample 1, and thus, there is a possibility that the thermally conductive material 10 peels off from the PET film 20 when attached to an electronic component or the like. In addition, since the average particle size of the silicon carbide 13 is small in Sample 3, Sample 4 shown in Table 4 is a material in which the polymer 11 in Sample 2 is replaced by a polymer having about 0.1% by weight of bifunctional acrylate added thereto with respect to the acrylic polymer. Sample 4 exhibited extremely favorable vibration-damping properties (loss factor tan δ=1.2), and a compressive load required to compress the thermally conductive material 10 having the thickness of 100 μm by 30% was small (40 N/cm²). However, adhesiveness between the thermally conductive material 10 and the PET film 20 was still low although improved somewhat, and thus, there is a possibility that the thermally conductive material 10 peels off from the PET film 20 when attached to an electronic component or the like.

TABLE 5

Sample 5

| | Ingredient | | | | | |
|---|---|---|---|---|---|---|
| | Acrylic polymer | Bifunctional acrylate | Vulcanizing agent | Silicon carbide | Magnesium hydroxide | Aluminum hydroxide |
| Manufacturer | Nippon Shokubai Co., Ltd. | Kyoeisha Chemical Co., Ltd. | Kayaku Akzo Corporation | Showa Denko K.K. | Konoshima Chemical Co., Ltd. | Nippon Light Metal Co., Ltd. |
| Item number | HD-A218 | 1.6HX-A | Perkadox 16 | GC#600 | N-4 | BF083 |
| Average particle size (μm) | — | — | — | 35 | 0.5 | 8 |
| wt % | 20.996 | 0.04 | 0.21 | 31.50 | 15.754 | 31.5 |

Sample 5 shown in Table 5 is a material in which the polymer 11 in Sample 2 is replaced by a polymer having about 0.19% by weight of bifunctional acrylate added thereto with respect to the acrylic polymer. Sample 5 exhibited much more favorable vibration-damping properties (loss factor tan δ=1.4), and a compressive load required to compress the thermally conductive material 10 having the thickness of 100 μm by 30% was small (40 N/cm²). Adhesiveness between the thermally conductive material 10 and the PET film 20 was high, and thus, there is no need to be concerned about peeling-off of the thermally conductive material 10 from the PET film 20 when the thermally conductive material 10 is attached to an electronic component or the like.

Therefore, when Sample 5 is used for a thin terminal, such as a multifunctional mobile phone and a tablet PC, Sample 5 can be compressed favorably with a small compressive load against a thin substrate or a thin casing, and exhibits favorable vibration-damping properties and thermal conductivity. Moreover, since the thermally conductive material 10 of a film shape is firmly adhered to the PET film 20, the thermally conductive material 10 is improved in sliding properties, and can be easily attached (assembled) to the thin terminal. Furthermore, since the PET film 20 having a thickness of 6 μm or less is easily deformed and has favorable sliding properties, handling of the thermally conductive material 10 becomes extremely easy.

In addition, since the surface of the thermally conductive material 10 opposite to the surface on which the PET film 20 is layered has adhesiveness, it is possible to easily attach the thermally conductive material 10 to an electronic component or the like without involving an adhesive tape or the like that inhibits thermal conductivity. Therefore, the thermal conductivity can be exerted much more favorably. Furthermore, although there are some cases where plasma treatment or the like is performed in order to provide films in general with such adhesiveness, such a treatment is unnecessary in the case of Sample 5. The thermally conductive material 10 may be shipped and carried in a state in which a separator is applied to the above-describe opposite surface, and the separator may be peeled away when the thermally conductive material 10 is to be attached.

TABLE 6

Sample 6

| | Ingredient | | | | | |
|---|---|---|---|---|---|---|
| | Acrylic polymer | Bifunctional acrylate | Vulcanizing agent | Silicon carbide | Magnesium hydroxide | Aluminum hydroxide |
| Manufacturer | Nippon Shokubai Co., Ltd. | Kyoeisha Chemical Co., Ltd. | Kayaku Akzo Corporation | Showa Denko K.K. | Konoshima Chemical Co., Ltd. | Nippon Light Metal Co., Ltd. |
| Item number | HD-A218 | 1.6HX-A | Perkadox 16 | GC#600 | N-4 | BF083 |
| Average particle size (μm) | — | — | — | 35 | 0.5 | 8 |
| wt % | 20.98 | 0.056 | 0.21 | 31.50 | 15.754 | 31.5 |

Sample 6 shown in Table 6 is a material in which the polymer 11 in Sample 2 is replaced by a polymer having about 0.27% by weight of bifunctional acrylate added thereto with respect to the acrylic polymer. Sample 6 exhibited much more favorable vibration-damping properties (loss factor tan δ=1.5), and a compressive load required to compress the thermally conductive material 10 having the thickness of 100 μm by 30% was small (40 N/cm²). Adhesiveness between the thermally conductive material 10 and the PET film 20 was high, and thus, there is no need to be concerned about peeling-off of the thermally conductive material 10 from the PET film 20 when the thermally conductive material 10 is attached to an electronic component or the like. Therefore, Sample 6 similarly produces the above-described effects in Sample 5, and exhibits much more excellent vibration-damping properties.

TABLE 7

Sample 7

| | Ingredient | | | | | |
|---|---|---|---|---|---|---|
| | Acrylic polymer | Bifunctional acrylate | Vulcanizing agent | Silicon carbide | Magnesium hydroxide | Aluminum hydroxide |
| Manufacturer | Nippon Shokubai Co., Ltd. | Kyoeisha Chemical Co., Ltd. | Kayaku Akzo Corporation | Showa Denko K.K. | Konoshima Chemical Co., Ltd. | Nippon Light Metal Co., Ltd. |
| Item number | HD-A218 | 1.6HX-A | Perkadox 16 | GC#600 | N-4 | BF083 |
| Average particle size (μm) | — | — | — | 35 | 0.5 | 8 |
| wt % | 20.931 | 0.105 | 0.21 | 31.50 | 15.754 | 31.5 |

Sample 7 shown in Table 7 is a material in which the polymer 11 in Sample 2 is replaced by a polymer having about 0.50% by weight of bifunctional acrylate added thereto with respect to the acrylic polymer. Sample 7 exhibited extremely favorable vibration-damping properties (loss factor tan δ=1.3), and a compressive load required to compress the thermally conductive material 10 having the thickness of 100 μm by 30% was small (40 N/cm²). Adhesiveness between the thermally conductive material 10 and the PET film 20 was high, and thus, there is no need to be concerned about peeling-off of the thermally conductive material 10 from the PET film 20 when the thermally conductive material 10 is attached to an electronic component or the like. Therefore, Sample 7 similarly produces the above-described effects in Sample 5 although vibration-damping properties are somewhat inferior.

TABLE 8

Sample 8

| | Ingredient | | | | | |
|---|---|---|---|---|---|---|
| | Acrylic polymer | Bifunctional acrylate | Vulcanizing agent | Silicon carbide | Magnesium hydroxide | Aluminum hydroxide |
| Manufacturer | Nippon Shokubai Co., Ltd. | Kyoeisha Chemical Co., Ltd. | Kayaku Akzo Corporation | Showa Denko K.K. | Konoshima Chemical Co., Ltd. | Nippon Light Metal Co., Ltd. |
| Item number | HD-A218 | 1.6HX-A | Perkadox 16 | GC#600 | N-4 | BF083 |
| Average particle size (μm) | — | — | — | 35 | 0.5 | 8 |
| wt % | 20.826 | 0.210 | 0.21 | 31.50 | 15.754 | 31.5 |

Sample 8 shown in Table 8 is a material in which the polymer 11 in Sample 2 is replaced by a polymer having about 1% by weight of bifunctional acrylate added thereto with respect to the acrylic polymer. Sample 8 exhibited relatively favorable vibration-damping properties (loss factor tan δ=0.9), and a compressive load required to compress the thermally conductive material 10 having the thickness of 100 μm by 30% was small (40 N/cm²). However, adhesiveness between the thermally conductive material 10 and the PET film 20 was low, and thus, there is a possibility that the thermally conductive material 10 peels off from the PET film 20 when attached to an electronic component or the like.

[Consideration]

As described above, Samples 2 and 4 to 8 are prepared by allowing the silicon carbide 13 having the average particle size of 10 μm or more and less than 50 μm, the aluminum hydroxide 17 having the average particle size of 1 μm or more and less than 10 μm, and the magnesium hydroxide 15 having the average particle size of 0.5 μm or more and less than 1 μm to be contained in the polymer 11 obtained by polymerizing the monomer containing acrylic acid ester. In each of all these samples, the obtained thermally conductive material 10 can be easily formed into the thin film having the thickness of about 100 μm, and a compressive load required to deform the film by a predetermined amount is small. Therefore, when used for a thin terminal, such as a multifunctional mobile phone and a tablet PC, each of these samples can be compressed favorably against a thin substrate or a thin casing, and exhibits favorable vibration-damping properties and thermal conductivity. Moreover, each of these samples is free from fear of generating siloxane gas as in the case of a silicone-based thermally conductive material.

In contrast, Sample 1 prepared using the silicon carbide 13 having the average particle size of 80 μm, which is greater than 50 μm, requires a large compressive load (200 N/cm²) for deformation as described above, and thus, there is a possibility that the thermally conductive material 10 of Sample 1 may damage a substrate, an electronic component mounted on the substrate, and the like, when used by being compressed against a thin substrate or a thin casing. In the case of Sample 3 prepared using the silicon carbide 13 having the average particle size of 5 μm, which is less than 10 μm, it is difficult to mix and knead ingredients, and thickness reduction is also difficult.

In the above-described experimental examples, the average particle size of the silicon carbide 13 is varied among three types, i.e., 5 μm, 35 μm, and 80 μm, whereas the average particle size of the magnesium hydroxide 15 and the average particle size of the aluminum hydroxide 17 are respectively fixed to 0.5 μm and 8 μm. However, when the average particle size of the silicon carbide 13 is 10 μm or more and less than 50 μm, the average particle size of the aluminum hydroxide 17 is 1 μm or more and less than 10 μm, and the average particle size of the magnesium hydroxide 15 is 0.5 μm or more and less than 1 μm, a structure close to a closest packing structure can be achieved. Thus, it can be speculated that thickness reduction will be easy and a compressive load required for deformation will be small.

From among Samples 2 and 4 to 8, in Samples 5 to 7, the bifunctional acrylate-based multifunctional monomer of more than 0.1 and less than 1% by weight with respect to the polymer 11 is added. Such samples are improved in adhesiveness of the thermally conductive material 10 to the PET film 20, and can be handled more easily if one surface is applied to the PET film 20 even in the case where the thermally conductive material 10 is formed into the film as described above. Furthermore, each of these samples has adhesiveness on the other side thereof, and thus, can be easily attached to an electronic component or the like without involving an object, such as a tape, which inhibits thermal conductivity.

[Other Embodiments of the Present Invention]

The present invention is not limited to the above-descried embodiments, and can be implemented in various forms within the scope not departing from the spirit of the present invention. For example, products other than the above-described may be utilized as the silicon carbide 13, the magnesium hydroxide 15, the aluminum hydroxide 17, and the like.

Moreover, various polymers can be used as the polymer 11 as long as they are obtained by polymerizing a monomer containing acrylic acid ester. For example, it is possible to use polymers or copolymers obtained by polymerizing or copolymerizing an acrylic monomer, such as ethyl(meta)acrylate, n-propyl(meta)acrylate, i-propyl(meta)acrylate, n-butyl(meta)acrylate, i-butyl(meta)acrylate, 2-ethylhexyl (meta)acrylate, n-hexyl(meta)acrylate, n-amyl(meta)acrylate, i-amyl(meta)acrylate, octyl(meta)acrylate, i-octyl (meta)acrylate, i-myristyl(meta)acrylate, lauryl(meta)acrylate, nonyl(meta)acrylate, i-nonyl(meta)acrylate, i-decyl (meta)acrylate, tridecyl(meta)acrylate, stearyl(meta) acrylate, i-stearyl(meta)acrylate. Acrylic acid ester used for the above-described (co)polymerization may be used in combination of two or more, as well as used independently.

Furthermore, as the bifunctional acrylate-based multifunctional monomer, 1,6-hexanediol diacrylate, ethylene glycol diacrylate, and the like can be used, and as an acrylate-based multifunctional monomer having three or more functional groups, trimethylolpropane triacrylate, pentaerythritol hexaacrylate, dipentaerythritol hexaacrylate, and the like can be used.

What is claimed is:

1. A thermally conductive material prepared by allowing silicon carbide having an average particle size of 10 μm or more and less than 50 μm, aluminum hydroxide having an average particle size of 1 μm or more and less than 10 μm, and magnesium hydroxide having an average particle size of 0.5 μm or more and less than 1 μm to be contained in a polymer obtained by polymerizing a monomer containing acrylic acid ester;
   wherein a multifunctional acrylate-based monomer of more than 0.1% and less than 1% by weight with respect to the polymer is further added to the polymer, and wherein said thermally conductive material is formed into a film having a thickness of 100 μm to 300 μm; and
   wherein the polymer contains 100 to 200 parts by weight of the silicon carbide, 100 to 200 parts by weight of the aluminum hydroxide, and 50 to 100 parts by weight of the magnesium hydroxide, with respect to 100 parts by weight of the polymer, wherein:
   the average SiC particle size is 35 μm,
   the average $Al(OH)_3$ particle size is 8 μm, and
   the average $Mg(OH)_2$ particle size is 0.5 μm.

* * * * *